United States Patent
Cohn et al.

(10) Patent No.: US 6,714,644 B1
(45) Date of Patent: Mar. 30, 2004

(54) RINGING SCHEDULING FOR FXS PORTS ON PLATFORMS WITH LIMITED POWER SUPPLY

(75) Inventors: Jonathan Cohn, Novato, CA (US); Somnath Mitra, San Leandro, CA (US)

(73) Assignee: Cisco Technology, Inc., San Jose, CA (US)

( * ) Notice: Subject to any disclaimer, the term of this patent is extended or adjusted under 35 U.S.C. 154(b) by 326 days.

(21) Appl. No.: 09/737,173

(22) Filed: Dec. 13, 2000

(51) Int. Cl.⁷ .......................... H04M 1/00; H04M 3/00
(52) U.S. Cl. ................ 379/372; 379/418; 379/179; 379/90.01; 379/251
(58) Field of Search .............. 379/372, 142.04, 379/88.26, 88.19, 253, 413.01, 251, 256, 322, 142.01, 179, 211.03, 90.01, 93.23, 245, 373.01, 418; 455/405; 331/141

(56) References Cited

U.S. PATENT DOCUMENTS

| | | | | |
|---|---|---|---|---|
| 4,406,004 A | * | 9/1983 | Hall et al. .................. 370/249 |
| 4,747,124 A | * | 5/1988 | Ladd ........................ 379/88.19 |
| 4,761,807 A | * | 8/1988 | Matthews et al. ........ 379/88.26 |
| 5,173,933 A | * | 12/1992 | Jabs et al. .................. 455/405 |
| 6,111,939 A | * | 8/2000 | Brabanec ............... 379/142.04 |
| 6,300,844 B1 | * | 10/2001 | Sanner ........................ 331/141 |

* cited by examiner

Primary Examiner—Minsun Oh Harvey
Assistant Examiner—Con P. Tran
(74) Attorney, Agent, or Firm—Sierra Patent Group, Ltd.

(57) ABSTRACT

An apparatus and method for supporting enhanced ring scheduling for devices on platforms with limited power supply while seeking to preserve caller ID information and normal ringing cadence is disclosed. The ring scheduling apparatus includes a "Line Manager" coupled to a "Ring Scheduler". The Line manager monitors the signaling events and determines whether the signaling commands associated with the signaling events should be modified to indicate ringing, no ringing, or pass the signaling commands unmodified. The "Ring Scheduler" manages the available resources according to a ring cadence schedule so that the power supply of the device is not exceeded.

16 Claims, 4 Drawing Sheets

RINGING SCHEDULING FOR FXS PORTS ON PLATFORMS WITH LIMITED POWER SUPPLY

BACKGROUND OF THE INVENTION

1. Field of the Invention

This invention pertains generally to ring scheduling algorithms. More particularly, the invention is an apparatus and system for supporting enhanced ring scheduling for device ports on platforms having limited power supply. The present invention further seeks to preserve caller ID when possible.

2. The Prior Art

Voice over protocol standards, such as VoIP (Voice over Internet Protocol) and VoATM (Voice over ATM), have been in development in recent years. Some network configurations implementing these standards may have a plurality of devices (e.g., phones) coupled thereto.

Due to hardware limitations, certain platforms cannot ring all the devices concurrently. As is known in the art, the total of all RENs (Ringer Equivalency Number) of the telephones connected to the one line must not exceed a predetermined value (e.g., five (5) RENs for some devices) or some or all of the ringers may not operate. Accordingly, most router devices with limited power supply have a maximum current rating which prevents ringing more than a certain number of phones devices on the network. In general, if the (maximum REN for the phone device) times the (number of phone lines) is greater than the (REN-rating of the particular router device), a ringing problem will arise. Thus, a router device having a maximum rating of 20 RENs operating with phone devices supporting a maximum of 5 RENs would be limited to ringing 4 phone lines according to prior art implementations.

Increasing the power supply to accommodate a higher current rating presents the problem that additional heat produced by the power supply must be dissipated, resulting in the need for larger and/or more expensive dissipation devices (e.g. fans) and typically larger device footprints, the results of which are not desirable.

A solution to provide support for ring scheduling for such devices with limited supply is thus needed to accommodate ringing for more than the system dependent limit. Furthermore, it would be advantageous to preserve the Caller ID information when possible. As is generally known, Caller ID information is communication from a source phone to the destination phone and identifies the phone number of the source to the destination phone. Preserving the Caller ID information would therefore provide better service to users of the system.

Accordingly, there is a need for an apparatus and method which provides for supporting enhanced ring scheduling for devices on platforms with limited power supply which further seeks to preserve Caller ID data. The present invention satisfies these needs, as well as others, and generally overcomes the deficiencies found in the background art.

BRIEF DESCRIPTION OF THE INVENTION

The present invention is an apparatus and method for supporting enhanced ring scheduling for devices on platforms with limited power supply while seeking to preserve caller ID information and normal ringing cadence.

In general, the ring scheduling apparatus of the present invention comprises a "Line Manager" coupled to a "Ring Scheduler". The Line manager is further operatively coupled for communication with the network line and with the local device ports (e.g. phones, DSPs, etc.). The Line manager monitors the signaling events originating both from the network and the local device ports. If the signaling events originate from the network, the Line Manager determines whether the signaling commands associated with the signaling events should be modified to indicate ringing, no ringing, or pass the signaling commands unmodified. Caller-ID support is provided during this operation.

According to the algorithm of the ring scheduling apparatus, the present invention is capable of ringing the maximum number of devices attached to the apparatus "simultaneously" (i.e., within the same ringing period) to overcome the prior-art ringing limitation. For example, conventional ringing cadence for North America comprises six (6) second periods, each period having a two (2) second ringing cycle followed by a four (4) second silent interval. According to one embodiment, the present invention utilizes a cadence having four (4) second periods, each period generally having a one (1) second ringing cycle followed by a three (3) second silent interval. Under this arrangement, the ring scheduling apparatus controls the ringing cadence of the local devices by scheduling a maximum of sixteen (16) ringing cycles per period with a time granularity of one-fourth (—¼) second. The invention is not limited to this arrangement, however. Under this example, the ring scheduling apparatus schedules ringing a maximum of four one-second ringing cycles per second, within the four second period. By managing the ringing cadence as described herein, 16 devices may be ringing during the same four-second period, 4 devices ringing per second of the period under this exemplary implementation.

To this end, the Line manager maintains a state machine for each line attached to the local device ports (line state machine). As described more fully below, the line state machine solution provides support for caller-ID. In general, the Line manager manages the state and transition between states for each line, the states including closed, idle, queue wait, active, ring 1, and long silent interval (LSI). The Line Manager communicates with the Ring Scheduler to determine the appropriate state of each line.

In general, the line is idle when the device attached is active and waiting for a ringing signal. When a ringing signal is directed to a device, the Line manager negotiates with the Ring Scheduler to determine if resources are available to ring the device. If not, the line state transitions to queue wait. Otherwise, if the line supports Caller-ID, the line state transitions to the Ring 1. If the line does not support Caller-ID, the state transitions to active. After the Ring 1 state, the line transitions to the long silent interval (LSI), where Caller-ID data is displayed. After the LSI state, the line transitions to active. At any time the line state may transition to idle, if for example the remote device goes "on hook" or if the target device goes "off hook".

During the active state, the line transitions between a "ringing" state and a "no ringing" state according to the ringing cadence under consideration. As noted above, the cadence according to this present exemplary implementation provides a ringing cycle of one second followed by a three second silent cycle. The ringing/silent state cycling is maintained by the Ring Scheduler. In this way, the Ring Scheduler manages the resource allocation and reallocation of line usage by scheduling ringing according to the ringing algorithm described above. For each line attached to a device, the Ring Scheduler maintains a plurality of time slots, each time slot indicating whether the device is ringing, not ringing, or reserved. In this way, the Ring Scheduler is able to allocate time slots for ringing the maximum number of devices.

The Ring Scheduler also maintains a state of "reserved" for a line. The scheduler marks a reserved for the duration of the RING1 state to indicate that that line is ringing, so the resources (REN's) cannot be allocated to another line. For example, in a case where caller ID is supported and a new ringing indication is received, the Ring Scheduler is queried to determine if there are sufficient resources to ring a line for up to a predetermined amount of time (e.g. 4 seconds). If so, the Ring Scheduler reserves time slots (e.g. 4 seconds) for that line. The reserved time slots are later de-allocated when a no-ringing indication is received. This process is described in further detail below.

It is noted that ringing 16 devices simultaneously, although the maximum of devices for the cadence under this scheme, is only illustrative, and the present invention is suitable for use with other cadence schemes having different period lengths and ringing/silent cycles as would be readily apparent to those skilled in the art having the benefit of this disclosure.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Referring more specifically to the drawings, for illustrative purposes the present invention is embodied in the apparatus shown FIG. 1 through FIG. 4. It will be appreciated that the apparatus may vary as to configuration and as to details of the parts, and that the method may vary as to details and the order of the acts, without departing from the basic concepts as disclosed herein. The invention is disclosed generally in terms of ring scheduling apparatus operating in a router device, although numerous other uses for the invention will suggest themselves to persons of ordinary skill in the art.

Figure 1:
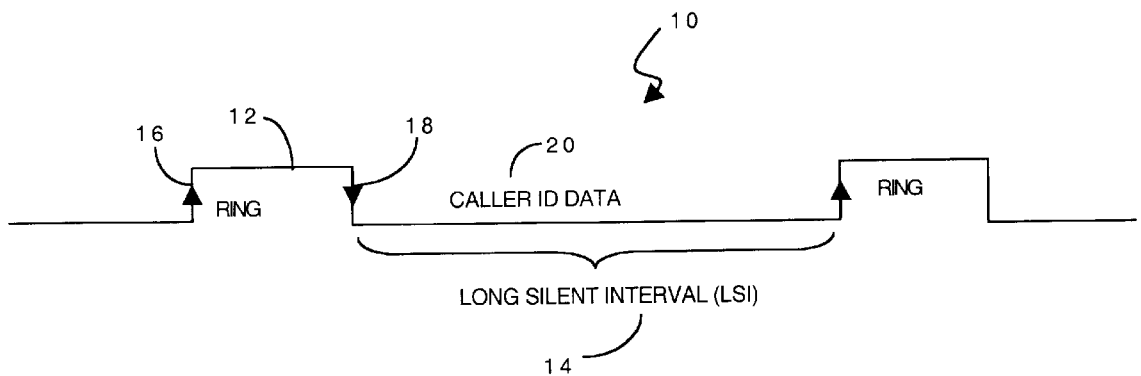
FIG. 1 is a block diagram depicting an example North American ring cadence according to the prior art.

Referring first to FIG. 1, there is shown a block diagram of an example North American ring cadence 10 according to the prior art. Cadence 10, although only illustrative, will be useful in describing the algorithm of the present invention. Cadence 10 comprises a four second period which includes a ring cycle 12 followed by a long silent interval (LSI) 14. The ring cycle 12 is generally a one second interval, although the Telcordia GR-30-CORE specification allows the ring cycle to be from 0.2 to 3 seconds. The start of ring cycle 12 is indicated by the rising portion 16, and the end of the ring cycle 12 is indicated by the falling portion 18.

The LSI 14 is the first silent cycle and follows the first ring cycle 12. The LSI 14 is generally three seconds. As is known in the art, the Caller-ID data 20 is played during the LSI cycle. The Caller-ID data is received by the target device which decodes the Caller-ID data for displaying thereon. As noted above, the present invention is suitable for use with other cadence schemes (e.g., United Kingdom) having different period lengths and ringing/silent cycles as would be readily apparent to those skilled in the art having the benefit of this disclosure.

Figure 2:
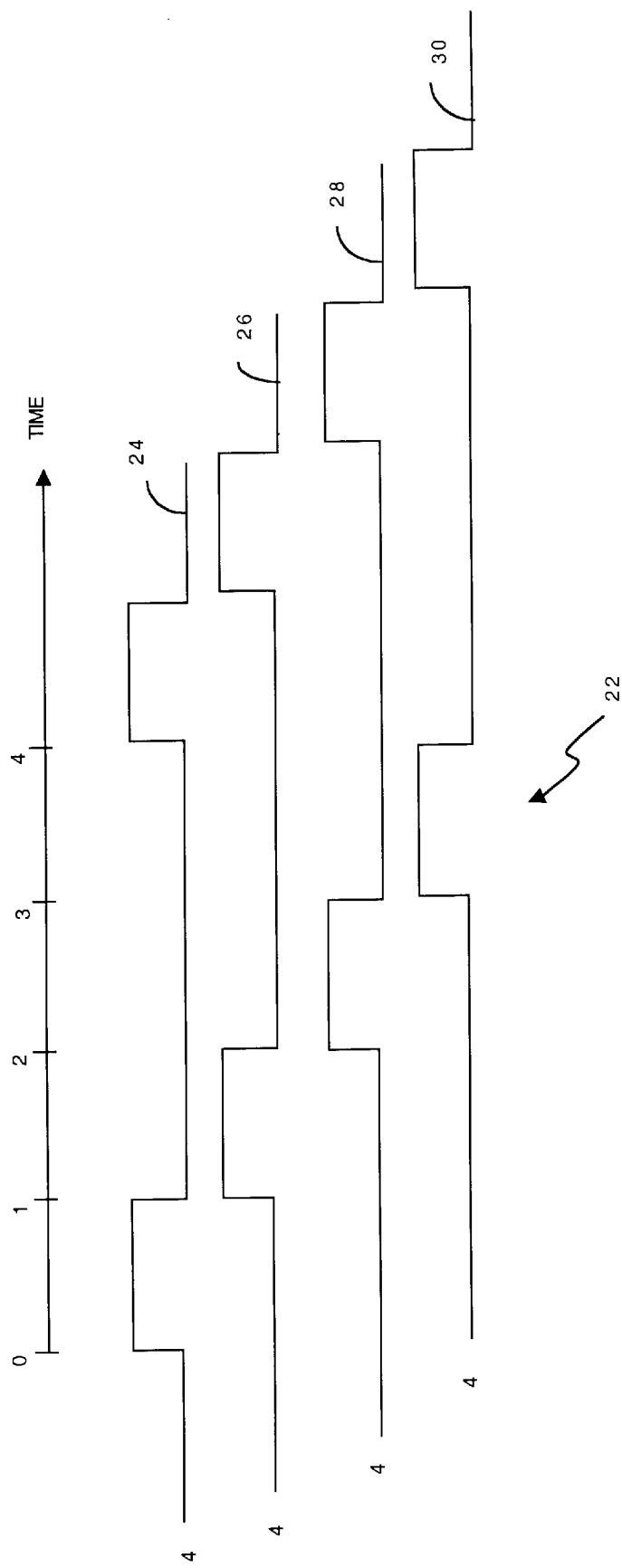
FIG. 2 is a block diagram depicting the maximum ringing cadence for North American PABX cadence according to the present invention

Referring next to FIG. 2, there is shown a block diagram depicting the maximum ringing cadence 22 for North American PABX cadence according to the present invention. Under this arrangement, the present invention provides for ringing 16 lines during a four second period. As shown in FIG. 2, four lines represented by signal 24 may be ringing during the first one-second cycle (time 1), followed by its corresponding silent cycle. Additionally, four lines represented by signal 26 may be ringing during the second one-second cycle (time 2), followed by its corresponding silent cycle. Similarly, signals 28 and 30 represent four lines each corresponding to the ringing signal for the third and fourth one-second cycle (time 3 and time 4, respectively). By controlling ring cadence according to this scheme, the ring scheduling apparatus may support ringing sixteen lines during the four-second period ring period.

Figure 3:
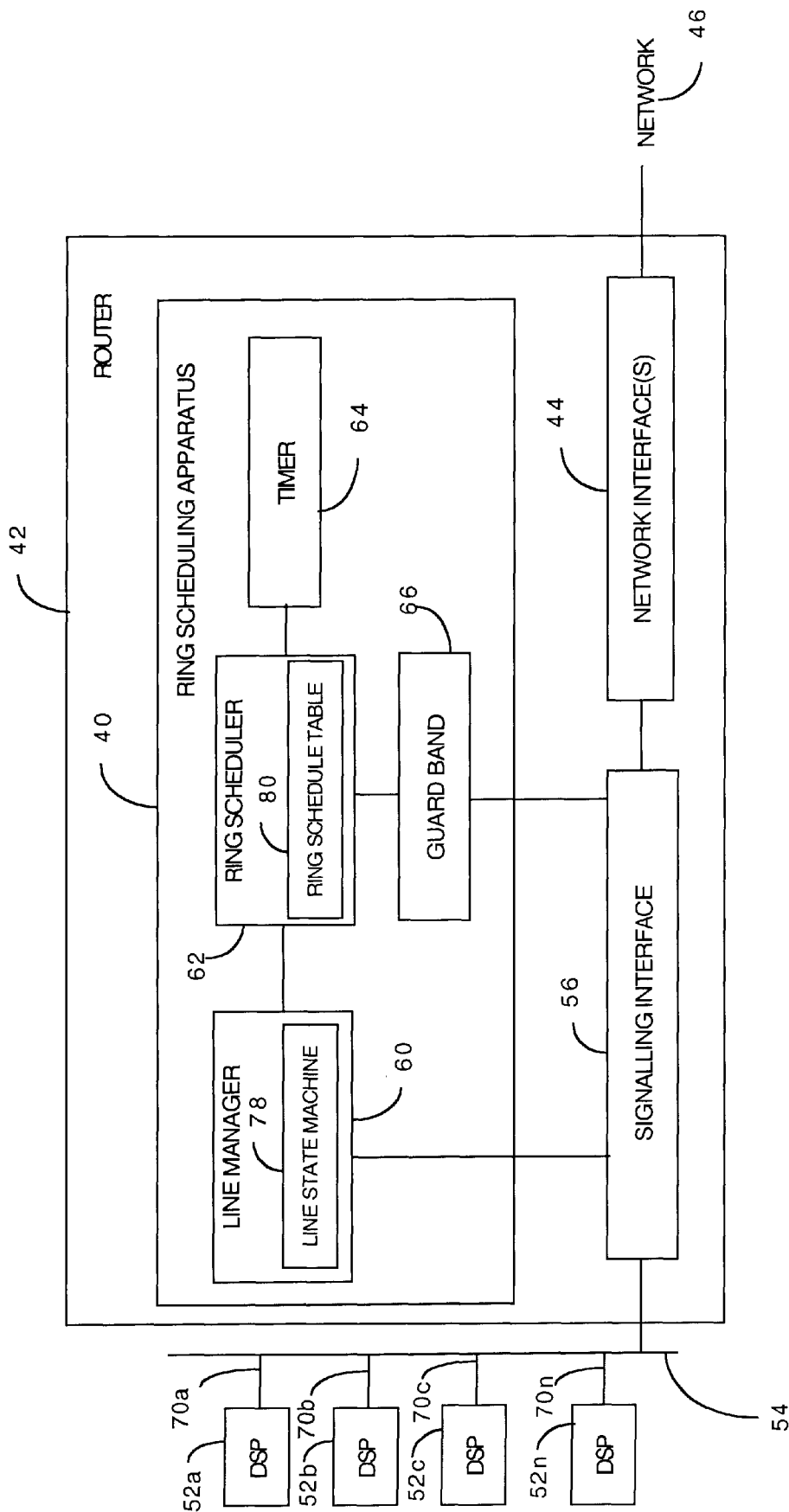
FIG. 3 is a functional block diagram depicting the ring scheduling apparatus according to the present invention operating in a router device.

Referring now to FIG. 3, as well as FIG. 2, there is shown a functional block diagram depicting the ring scheduling apparatus 40 according to the present invention operating in a router device 42, although the ring scheduling apparatus 40 is equally suitable for execution in other conventional data processing devices or computers. Router 42 includes conventional hardware components (not shown), such as a processor, a memory, and input/output devices. Router 42 further includes one or more network interfaces 44 which are operatively coupled for communication with a network 46.

The ring scheduling apparatus (RSA) 40 typically operates in conjunction with a router operating system (ROS) executed by the router 42. As such, RSA 40 typically comprises software suitable for execution by the router 42. Router 42 is typically coupled to one or more (digital signal processors) (DSP) 52a through 52n via communication line 54.

As is generally known in the art, the router 42 also comprises other (application program interface) (API) and driver components which are generally designated as signaling interface 56 in FIG. 3. The signaling interface 56, among other things, routes data between the local network connected to line 54 and the remote network 46. For example the signaling interface 56 supports the transport of (channel associated signaling) (CAS), as well as other signaling types.

The RSA 40 is operatively coupled to the signaling interface 56 for managing and scheduling the ringing cadence of devices 52a through 52n in accordance with the invention. The RSA 40 comprises a Line Manager 60 operatively coupled for communication to the signaling interface 56, a Ring Scheduler 62 operatively coupled for communication to the Line Manager 60, a timer 64 operatively coupled to the Ring Scheduler 62, and a Guard Band 66 operatively coupled between the ring scheduler 62 and the signaling interface 56.

The Line Manager 60 monitors the signaling packets communicated to the signaling interface 56 to determine whether the signaling packets should be modified to indicate ringing or no ringing, or pass the signaling packet unmodified. The signaling interface 56 responsive to commands indicated by the line manager 60 modifies or does not modify the signaling packets accordingly. The Line Manager 60 further maintains a state machine for each line 70a through 70n (corresponding to devices 52a through 52n) attached to the router 42 to maintain the state of each line. The state machines maintained by the Line Manager 60 are generally designated as Line State Machines 78 in FIG. 3. According to the state of the line as maintained by the Line Manager 60, the Line Manager 60 provides the appropriate command (i.e., ring, no ring, or pass packet unmodified) to the signaling interface 56.

Figure 4:
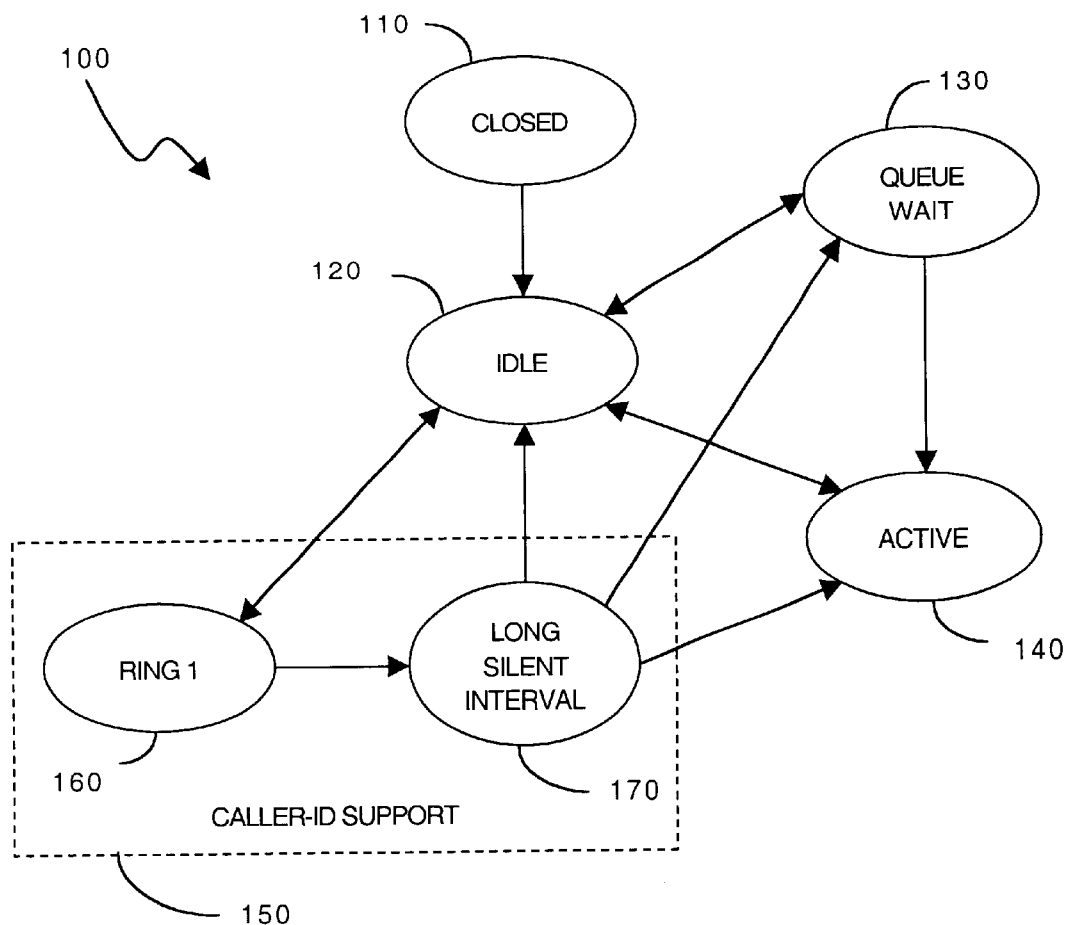
FIG. 4 is a state diagram depicting the line state machine as maintained by the Line Manager according to the present invention.

The details of the state machine maintained by the Line Manager 60 are better described in conjunction with FIG. 4, as well as FIG. 2 and FIG. 3. In general. FIG. 4 depicts an illustrative line state machine 100 as maintained by the Line Manager 60 according to the present invention. The Line Manager 60 maintains a similar state machine for each line 70a through 70n.

As shown in FIG. 4, state machine 100 comprises states "Closed" 110, "Idle" 120, "Queue Wait" 130, "Active" 140, "Ring 1" 160, and "LSI" 170. States "Ring 1" 160 and "LSI" 170 provides Caller-ID support 150 for lines configured to support the Caller-ID feature.

When the device attached to a line is inactive, the line remains in the Closed state 100. Once the device is activated, the line state transitions to the Idle state 120, wherein the Line Manager 60 awaits for a signaling event directed to the line under consideration. Although not shown to avoid complicating the state machine diagram, a path could be drawn from the states 120 through 170 to the closed state 110 to accommodate the event where the device attached to the line is deactivated.

When a signaling event (e.g., a signal to ring the line) is detected by the Line Manager 60, the Line Manager 60 queries the Ring Scheduler 62 to determine whether resources are available to ring the line. More specifically, If caller ID is supported, the line manager requests resources for the first full ring (i.e., up to 3 seconds). If successful, the transition is made to RING1 160. If the Ring Scheduler 62 is out of resources for the first full ring, caller ID will be supported for the current call, but there may still be resources to ring the phone on the Ring Scheduler's cadence, in which case the Line Manager 60 requests resources for this. If successful, the transition is made to ACTIVE 140, otherwise the transition is made to QUEUE WAIT 130. If caller ID is not supported, the Line Manager 60 requests resources for the Ring Scheduler's cadence. If successful, the line transitions to ACTIVE 140 (American PBX cadence), then the example should have 4 successive R's (to indicate 1 second of ringing, as will be described in more detail later) followed by 12 successive N's (to indicate no ringing).

If resources are not available, the line state transitions to the Queue Wait state 130 until the Ring Scheduler 62 determines that resources are available. It is noted that the line state may transition back to the Idle state 120 when either the remote device goes "on hook" (i.e., hang up) or the target device goes "off hook" (i.e., pick up).

Caller-ID support 150 is indicated by states 160 and 170. In the Ring 1 state 160, the Line Manager 60 communicates a command to the signaling interface 56 to allow all signaling and voice data to be sent to the destination DSP transparently (i.e., without modification). The Ring 1 state is generally one second. It is during this state that ringing signaling is typically sent to the destination DSP. The line state then transitions to the LSI state 170 after the Ring 1 state. During the LSI state 170, the Line Manager 60 communicates a command to the signaling interface 56 to allow all signaling and voice data to be sent to the destination DSP transparently. This state, which is generally three seconds, is where the Caller-ID data may be displayed. After the LSI state 170, the line state normally transitions to the Active state 140. However, there may be cases where resources are not available, and thus the line state transitions to the queue wait state 130, until resources become available or the line transitions to idle 120.

When a line state transitions to the active state 140, the Ringing Scheduler 62 manages (takes over) the ring cadence in accordance with the ring schedule is algorithm as described in FIG. 2 above. Referring again to FIG. 3, the Ring Scheduler 62 manages the resource allocation and reallocation of ringing signaling communicated to the lines 70a through 70n and to the associated devices 52a through 52n during the Active state 140.

The Ring Scheduler 62 also communicates with the Line Manager 60 to control the state for each line, such as where resources are requested for example. In particular, the Ring Scheduler 62 maintains a ring schedule 80 identifying the state of each line during a given time, easily visualized in a row and column table format, although other suitable data structures for maintaining the ring schedule for each line may be used. The timer 64 provides proper clocking for the Ring Scheduler for scheduling signals.

In general, the ring schedule table 80 comprises a plurality of rows each corresponding to a line (or device) and a plurality of columns corresponding to time slots wherein a line may be in either a ringing (R), no ringing/silent (N) or reserved state (RES). An example ring schedule table 80 is shown below in Table 1.

TABLE 1

|    | T0 | T1 | T2 | T3 | T4 | T5 | T6 | T7 | T8 | T9 | T10 | T11 | T12 | T13 | T14 | T15 |
|----|----|----|----|----|----|----|----|----|----|----|-----|-----|-----|-----|-----|-----|
| L1 | R  | R  | R  | R  | N  | N  | N  | N  | N  | N  | N   | N   | N   | N   | N   | N   |
| L2 |    |    |    |    |    |    |    |    |    |    |     |     |     |     |     |     |
| L2 |    |    |    |    |    |    |    |    |    |    |     |     |     |     |     |     |
| Ln |    |    |    |    |    |    |    |    |    |    |     |     |     |     |     |     |

Table 1 comprises a plurality of times slot, designated T0 through T15 to correspond with the present example, where North American PBX cadence is supported, each time slot representing ¼ second. Table 1 further comprises a plurality of rows, designated L0 through Ln, each corresponding to a line.

For a given line (L0 through Ln), the line state may be readily managed in accordance with the maximum ringing signaling as designated and described above in conjunction with FIG. 2. In the present example embodiment, the Ring Scheduler 62 may allocate a maximum of 4 ring signals per slot by allocating no more than 4 R states within a given time slot. Since the present example embodiment utilizes —¼ second granularity, four successive R states are used to represent one second of ringing, followed by a silent interval where the silent interval may be designated by 12 N states (3 seconds) following the 4 R states (1 second) as shown in Table 1 for L1.

The time slots T0 through T15 represent 4 periods, each period comprising 4 time slots. The number of time slots in Table 1 is only illustrative and is in no way limiting. However, organizing line states using a 4 period block is advantageous for use with the North American cadence scheme to represent 16 maximum lines, four lines ringing simultaneously. During management of line states using the ring schedule table 80, line states the Ring Scheduler 62 populates and clears the state values of the table in accordance with the maximum ringing algorithm of the invention as depicted in FIG. 2.

During state transitions (e.g., from N to R, from R to N), the Ring Scheduler 62 communicates the appropriate command to the signaling interface 56 to communicate the transition.

The RES state is used when the Line Manager 60 requests the Ring Scheduler 62 to reserve time slots for the first ring for caller ID support. Because the system 40 is not in control of the timing (at this point), time slots are reserved so they cannot be allocated for something else. However, if the Ring Scheduler 62 indicates that resources are not available, for whatever is happening, time slots are not allocated (no R, N, or RES). Typically this means waiting in a queue until resources are available. The only exception is when caller ID is supported. In this case, it is possible that there are not enough time-slots to be reserved for caller ID, in which case the first backup plan is to just request that the scheduler ring the phones when possible. If the scheduler has resources, then a queue wait is not necessary.

As shown in FIG. 3, signals communicated from the Ring Scheduler 62 to the signaling interface 56 via a guard band 66. The guard band 66 is implemented in systems in order to timely schedule signaling commands (i.e., command to run ringing on and off). Specifically, since signaling commands are normally buffered into queues, normally resident in both the ROS architecture and the DSP architecture, there is a risk that signaling commands may be executed out of the original order as scheduled by the Ring Scheduler 62. In general, the guard band provides the adequate timing correction to cure this possible timing conflict, although amount of timing correction varies according to the specifics of the ROS and DSP architecture as is known in the art.

Accordingly, it will be seen that this invention provides a ring scheduling apparatus provides for supporting enhanced ring scheduling for devices on platforms with limited power supply which further preserve, when possible, Caller ID data and normal ringing cadence. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A ring scheduling system operating in a data processing device, said data processing device having a signaling interface which is operatively coupled to a network and at least one local line, said ring scheduling system comprising:
   a line manager operatively coupled to the signaling interface, said line manager configured to monitor signaling commands communicated to the local line, said line manager further configured to modify said signaling commands to indicate ringing or no ringing; and
   a ring scheduler operatively coupled to said line manager and to the signaling interface, said ring scheduler configured to control the ringing cadence of each said local line, wherein each said signaling command includes a first cycle comprising a ring and a long silent interval, said line manager further configured to allow said first cycle of said signaling commands to be sent transparently for lines configured for caller identification.

2. The ring scheduling system of claim 1, wherein said data processing device is configured for limited power, said ring scheduler further configured to control the ringing cadence such that said limited power is not exceeded.

3. The ring scheduling system of claim 1, wherein said data processing device is configured for limited power, said ring scheduler further configured to allow said first cycle of said signaling commands to sent transparently if said limited power is not exceeded.

4. The ring scheduling system of claim 1, wherein said ring cadence comprises a one second ring interval followed by a three second silent interval.

5. A method for scheduling ring operation in a data processing device, said data processing device having a signaling interface which is operatively coupled to a network and at least one local line, said method comprising:
   monitoring signaling commands communicated to the local line; and
   modifying said signaling commands to indicate ringing or no ringing according to a predetermined ringing cadence for each said local line, wherein each said signaling command includes a first cycle comprising a ring and a long silent interval, said method further comprising allowing said first cycle of said signaling commands to be sent transparently for lines configured for caller identification.

6. The method of claim 5, wherein said data processing device is configured for limited power, said ringing cadence configured such that said limited power is not exceeded.

7. The method of claim 5, wherein said data processing device is configured for limited power, said allowing said first cycle of said signaling commands to be sent transparently only if said limited power is not exceeded.

8. The method of claim 5, wherein said ring cadence comprises a one second ring interval followed by a three second silent interval.

9. A program storage device readable by a machine, tangibly embodying a program of instructions executable by the machine to perform a method for scheduling ring operation in a data processing device, said data processing device having a signaling interface which is operatively coupled to a network and at least one local line, said method comprising:

monitoring signaling commands communicated to the local line; and modifying said signaling commands to indicate ringing or no ringing according to a predetermined ringing cadence for each said local line, wherein each said signaling command includes a first cycle comprising a ring and a long silent interval, said method further comprising allowing said first cycle of said signaling commands to be sent transparently for lines configured for caller identification.

10. The program storage device of claim 9, wherein said data processing device is configured for limited power, said ringing cadence configured such that said limited power is not exceeded.

11. The program storage device of claim 9, wherein said data processing device is configured for limited power, said allowing said first cycle of said signaling commands to be sent transparently only if said limited power is not exceeded.

12. The program storage device of claim 9, wherein said ring cadence comprises a one second ring interval followed by a three second silent interval.

13. A ring scheduling system operating in a data processing device, said data processing device having a signaling interface which is operatively coupled to a network and at least one local line, said ring scheduling system comprising:

means for monitoring signaling commands communicated to the local line; and means modifying said signaling commands to indicate ringing or no ringing according to a predetermined ringing cadence for each said local line, wherein each said signaling command includes a first cycle comprising a ring and a long silent interval, said ring scheduling system further comprising means for allowing said first cycle of said signaling commands to be sent transparently for lines configured for caller identification.

14. The ring scheduling system of claim 13, wherein said data processing device is configured for limited power, said ringing cadence configured such that said limited power is not exceeded.

15. The ring scheduling system of claim 13, wherein said data processing device is configured for limited power, said means for allowing said first cycle of said signaling commands to sent transparently only if said limited power is not exceeded.

16. The ring scheduling system of claim 13, wherein said ring cadence comprises a one second ring interval followed by a three second silent interval.

* * * * *